(12) United States Patent
Carpenter

(10) Patent No.: US 11,371,796 B1
(45) Date of Patent: Jun. 28, 2022

(54) DRAG ADJUSTING REEL ASSEMBLY

(71) Applicant: William J. Carpenter, Mansfield, LA (US)

(72) Inventor: William J. Carpenter, Mansfield, LA (US)

( * ) Notice: Subject to any disclaimer, the term of this patent is extended or adjusted under 35 U.S.C. 154(b) by 0 days.

(21) Appl. No.: 17/220,466

(22) Filed: Apr. 1, 2021

Related U.S. Application Data

(60) Provisional application No. 63/004,550, filed on Apr. 3, 2020.

(51) Int. Cl.
*F41B 5/14* (2006.01)
*A01K 89/00* (2006.01)

(52) U.S. Cl.
CPC .......... *F41B 5/1488* (2013.01); *A01K 89/006* (2013.01)

(58) Field of Classification Search
CPC .............. A01K 89/006; A01K 89/0102; A01K 89/0175; A01K 89/0189; A01K 89/01903; A01K 89/01906; A01K 89/01925; A01K 89/0193; A01K 89/046; A01K 89/058; A01K 89/059; F41B 5/1488
See application file for complete search history.

(56) References Cited

U.S. PATENT DOCUMENTS

| 4,674,471 A * | 6/1987 | Lance .................... A01K 81/00 43/19 |
| 9,383,160 B1 | 7/2016 | White |
| 2006/0016924 A1 * | 1/2006 | Hirayama ............ A01K 89/015 242/245 |
| 2016/0157473 A1 * | 6/2016 | Header ................ A01K 89/006 242/300 |
| 2017/0295768 A1 * | 10/2017 | Noble .................... F41B 5/1488 |
| 2019/0059344 A1 | 2/2019 | Braun et al. |
| 2019/0063866 A1 | 2/2019 | Braun et al. |

FOREIGN PATENT DOCUMENTS

KR   20110139094 A * 12/2011

* cited by examiner

*Primary Examiner* — Emmanuel M Marcelo
(74) *Attorney, Agent, or Firm* — R. Keith Harrison

(57) ABSTRACT

A drag adjusting reel assembly suitable for facilitating selective manual adjustment of a drag force applied to a fishing line may include a reel mount bracket configured for mounting on a fishing bow. A reel shaft may be carried by the reel mount bracket. A line spool may be drivingly engaged for rotation by the reel shaft. A drag adjusting mechanism may include a drag adjusting bracket carried by the reel mount bracket. A spool extension may extend from and be rotational with the line spool. The spool extension may be disposed adjacent to the drag adjusting bracket. A drag adjusting lever may include a cam having a cam surface configured to selectively actuate the spool extension against the drag adjusting bracket. The cam may be rotational between a free-spooling position in which the cam surface disengages or minimally engages the spool extension and the spool extension disengages or minimally engages the drag adjusting bracket, respectively, and a maximal drag, spool locking position in which the cam surface maximally engages the spool extension and the spool extension maximally engages the drag adjusting bracket. At least one lever arm may extend from the cam.

20 Claims, 6 Drawing Sheets

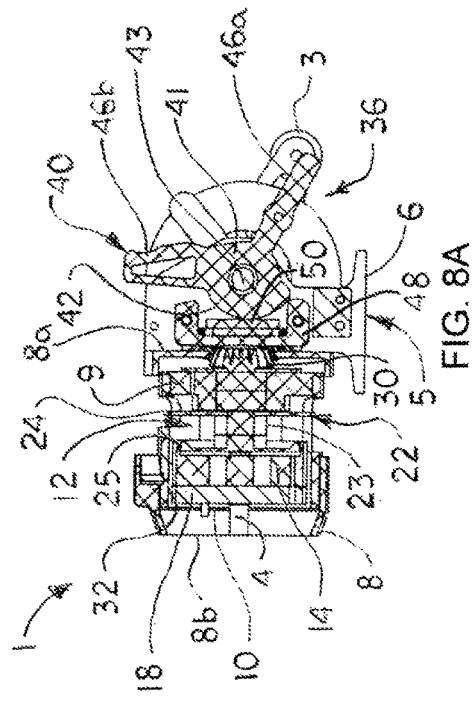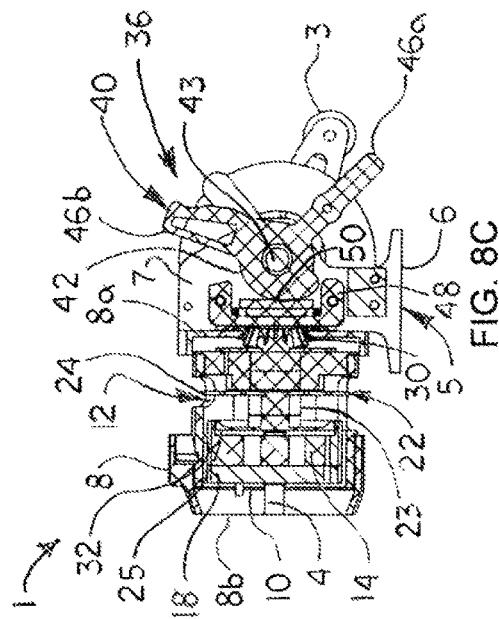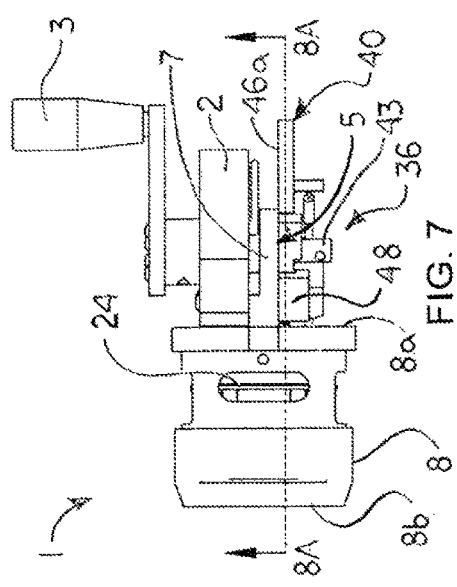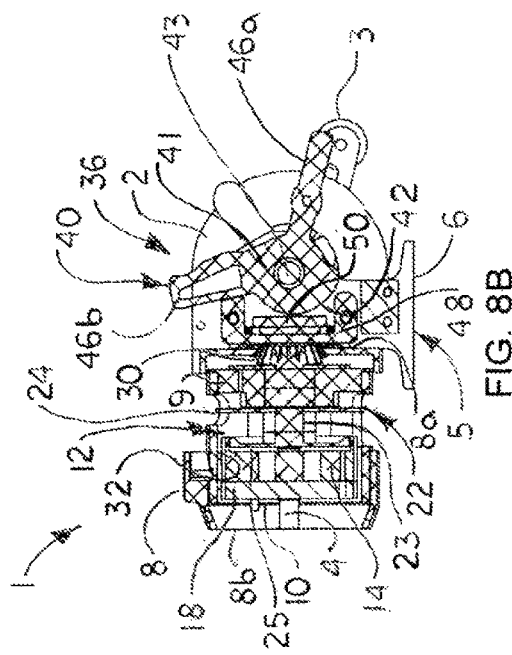

DRAG ADJUSTING REEL ASSEMBLY

CROSS-REFERENCE TO RELATED APPLICATIONS

This application claims the benefit of U.S. provisional application No. 63/004,550, filed Apr. 3, 2020 and entitled DRAG ADJUSTING REEL ASSEMBLY, which provisional application is hereby incorporated by reference herein in its entirety.

FIELD

Illustrative embodiments of the disclosure generally relate to reels for reeling a line such as a fishing line on a fishing rod or fishing bow. More particularly, illustrative embodiments of the disclosure relate to a drag adjusting reel assembly which is suitable for facilitating selective manual adjustment of a drag force applied to a fishing line.

SUMMARY

Illustrative embodiments of the disclosure are generally directed to a drag adjusting reel assembly which is suitable for facilitating selective manual adjustment of a drag force applied to a fishing line. An illustrative embodiment of the drag adjusting reel assembly may include a reel mount bracket configured for mounting on a fishing bow. A reel shaft may be carried by the reel mount bracket. A line spool may be drivingly engaged for rotation by the reel shaft. A drag adjusting mechanism may include a drag adjusting bracket carried by the reel mount bracket. A spool extension may extend from and be rotational with the line spool. The spool extension may be disposed adjacent to the drag adjusting bracket. A drag adjusting lever may include a cam having a cam surface configured to selectively actuate the spool extension against the drag adjusting bracket. The cam may be rotational between a free-spooling position in which the cam surface disengages or minimally engages the spool extension and the spool extension disengages or minimally engages the drag adjusting bracket, respectively, and a maximal drag, spool locking position in which the cam surface maximally engages the spool extension and the spool extension maximally engages the drag adjusting bracket. At least one lever arm may extend from the cam.

BRIEF DESCRIPTION OF THE DRAWINGS

Illustrative embodiments of the disclosure will now be described, by way of example, with reference to the accompanying drawings, in which:

FIG. 7 is a typical top view of the illustrative drag adjusting reel assembly;

FIG. 8A is a longitudinal sectional view, taken along section lines 8A-8A in FIG. 7, of the illustrative drag adjusting reel assembly with the drag adjusting lever shown in an intermediate or middle home position;

FIG. 8B is a longitudinal sectional view, taken along section lines 8A-8A in FIG. 7, of the illustrative drag adjusting reel assembly with the drag adjusting lever shown in a forward-pivoted, free-spooling position;

FIG. 8C is a longitudinal sectional view, taken along section lines 8A-8A in FIG. 7, of the illustrative drag adjusting reel assembly with the drag adjusting lever shown in a rearward-pivoted, spool-locking position;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "let", "rear", "right" "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
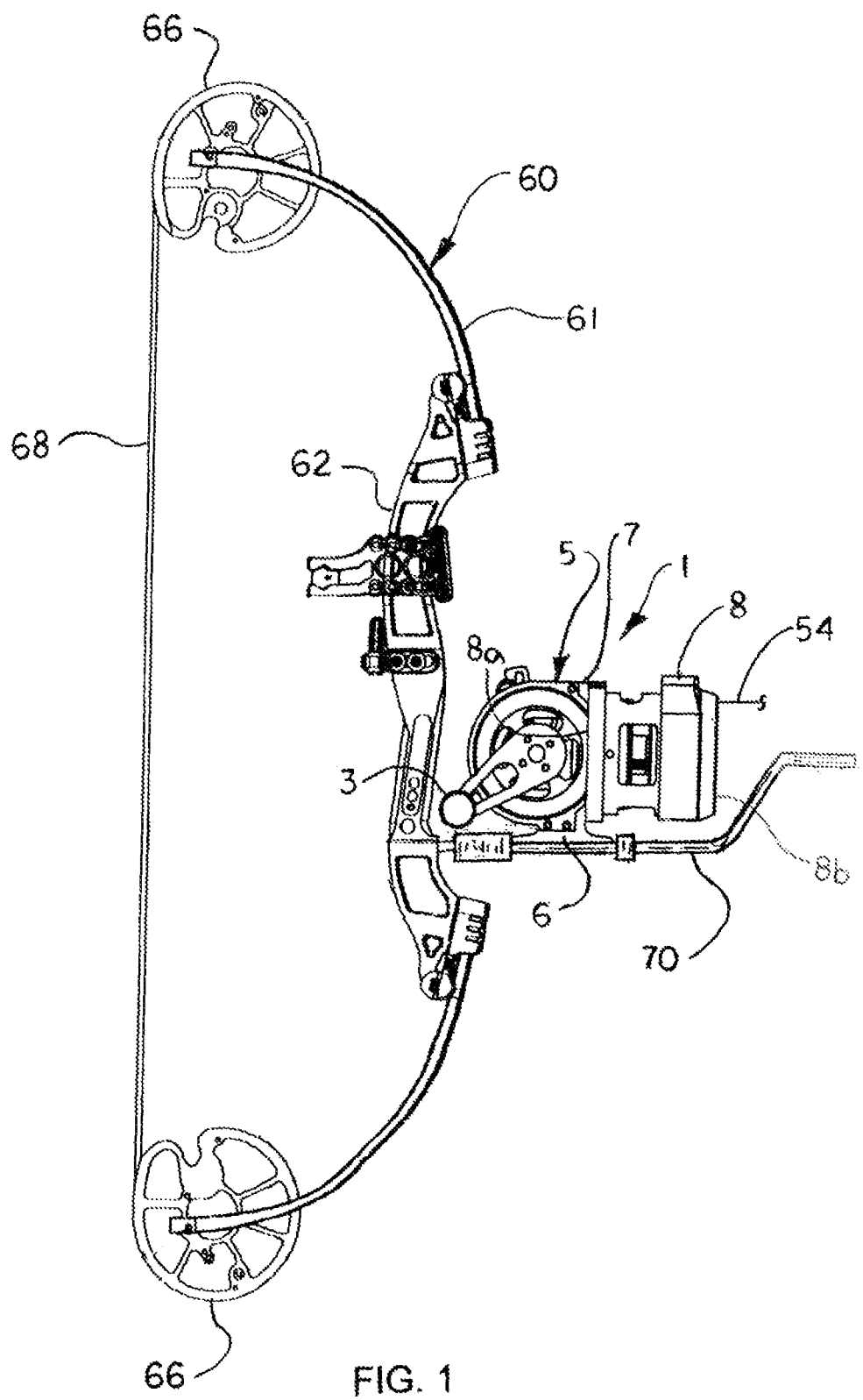
FIG. 1 is a typical right-side view of an illustrative embodiment of the drag adjusting reel assembly, mounted on a fishing bow in a typical bowfishing application of the assembly.
Figure 6:
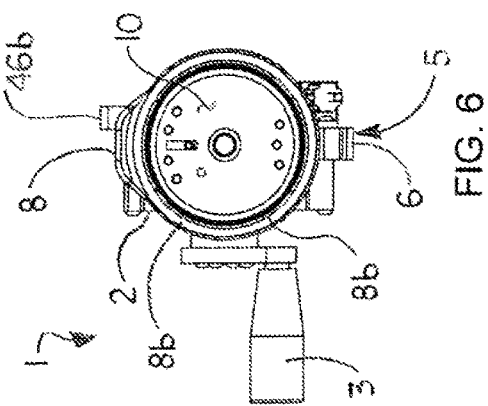
FIG. 6 is a typical front view of the illustrative drag adjusting reel assembly.
Figure 3:
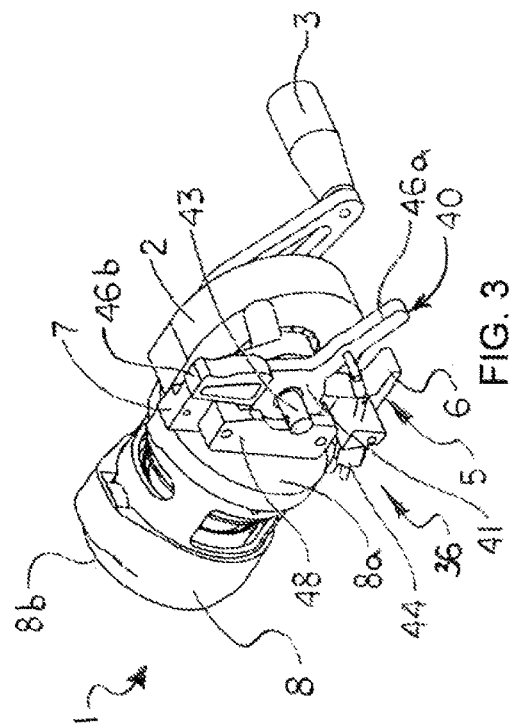
FIG. 3 is a typical left-side rear perspective view of the illustrative drag adjusting reel assembly.
Figure 5:
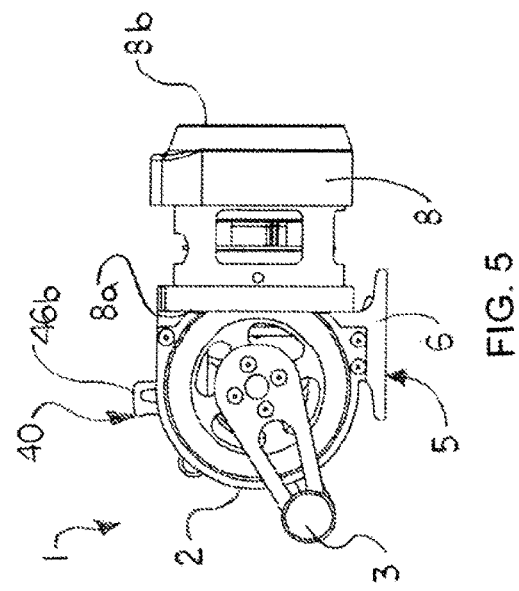
FIG. 5 is a typical right-side view of the illustrative drag adjusting reel assembly.
Figure 2:
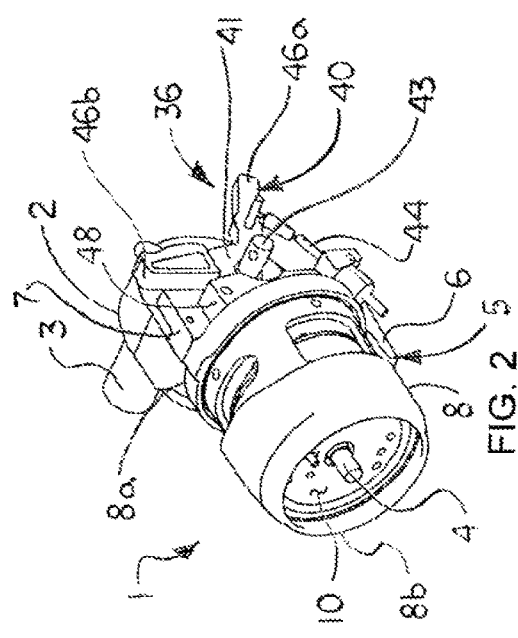
FIG. 2 is a typical left-side front perspective view of the illustrative drag adjusting reel assembly.
Figure 4:
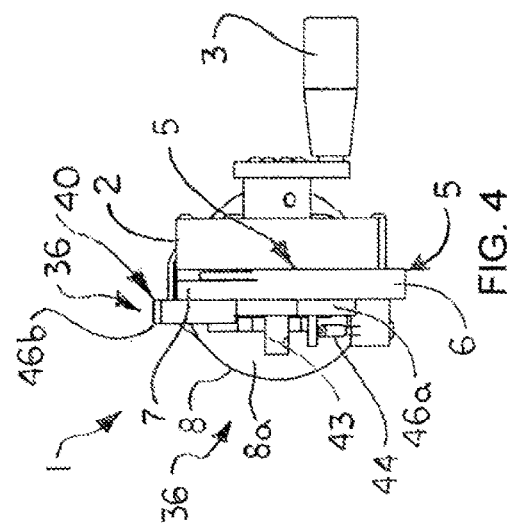
FIG. 4 is a typical rear view of the illustrative drag adjusting reel assembly.
Figure 10:
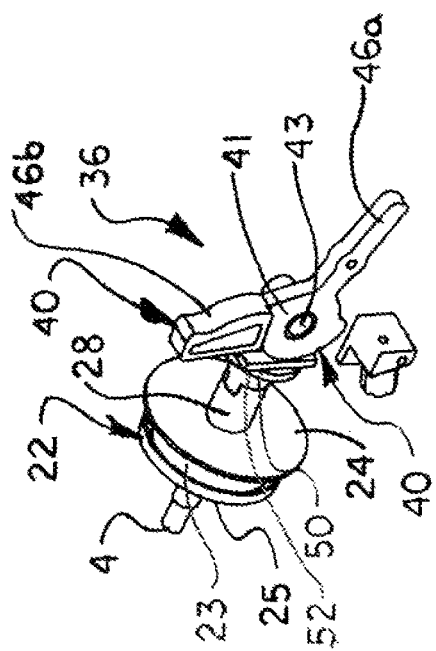
FIG. 10 is a typical left rear perspective view of a typical drag adjusting mechanism of the illustrative drag adjusting reel assembly.

Referring initially to FIG. 1 of the drawings, an illustrative embodiment of the drag adjusting reel assembly is generally indicated by reference numeral 1. The drag adjusting reel assembly 1 which is shown in FIGS. 1-12 is a right-handed version of the assembly, the left-handed version of the assembly being a mirror-image of the right-handed version of the assembly illustrated in the FIGURES. In typical application, which will be hereinafter described, the drag adjusting reel assembly 1 may be mounted on a fishing bow 60 to facilitate selective manual adjustment of a drag force which is applied to a fishing line 54. The fishing bow 60 may have a standard or conventional design with a bow frame 61, a riser 62, a pair of cams 66 on the bow frame 61 and a bowstring 68 extending between the cams 66. An assembly mount bracket 70 may extend forwardly from the riser 62. The drag reel assembly 1 may be mounted on the assembly mount bracket 70.

Referring next to FIGS. 2-12 of the drawings, the drag adjusting reel assembly 1 may include a reel mount bracket 5. The reel mount bracket 5 may facilitate attachment of the drag adjusting reel assembly 1 to the assembly mount bracket 70 (FIG. 1) or to any other suitable structural element or component of the fishing bow 60 according to the knowledge of those skilled in the art. Accordingly, in some embodiments, the reel mount bracket 5 may include a mount pedestal 6. The mount pedestal 6 may be suitably shaped or configured to engage the assembly mount bracket 70 and may include provisions for mechanical fasteners (not illustrated) such as screws, bolts, clamps, clips or the like to facilitate securement of the mount pedestal 6 to the assembly mount bracket 70. A mount frame 7 may extend from the mount pedestal 6. The mount frame 7 may facilitate mounting of the various components of the drag adjusting reel assembly 1 typically as will be hereinafter described.

A crank housing 2 may be provided on the mount frame 7 of the reel mount bracket 5. A manually rotatable reel crank 3 may be mounted on the crank housing 2. An elongated reel shaft 4 may extend forwardly from the crank housing 2. A gear train (not illustrated) may be contained in the crank housing 2. The gear train may be drivingly engaged by the reel crank 3 and may drivingly engage the reel shaft 4, such as through a pinion gear 30 (FIGS. 8A-9 and 11), for example and without limitation, to transmit rotation from the reel crank 3 to the reel shaft 4, typically in the conventional manner.

Figure 11:
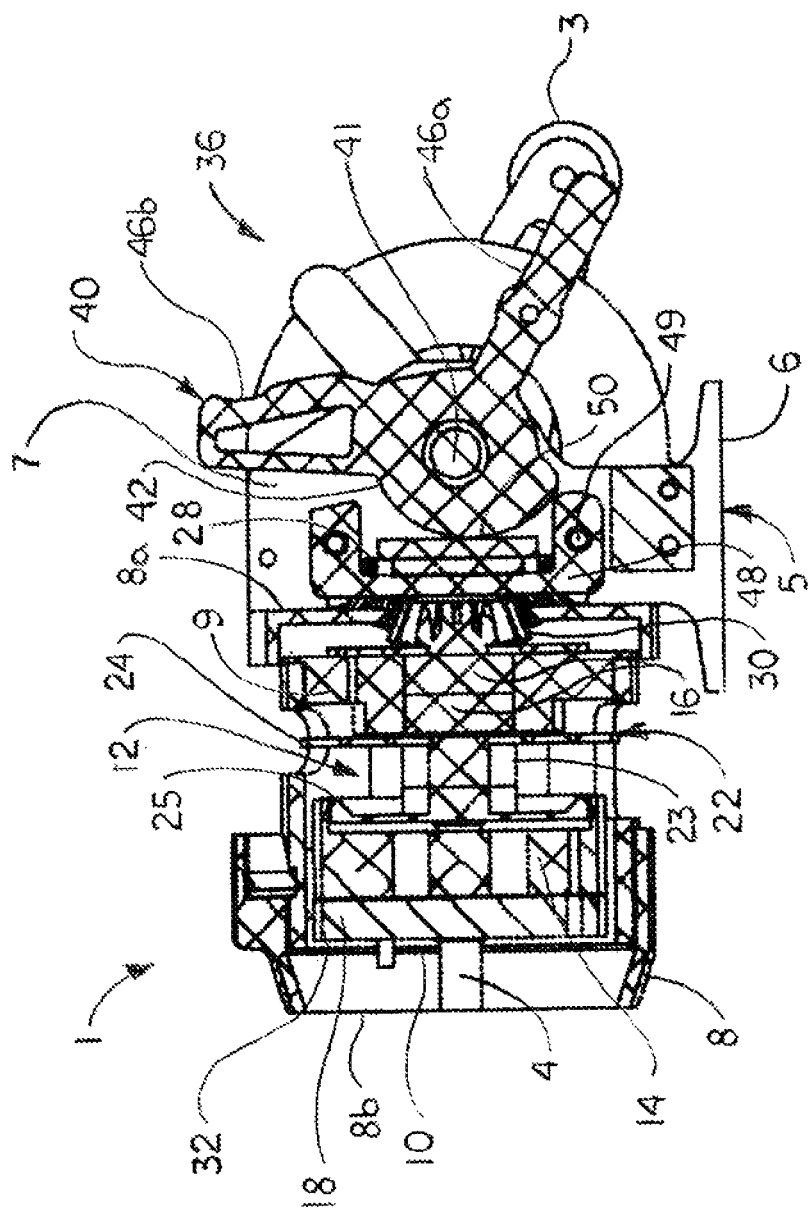
FIG. 11 is an enlarged longitudinal sectional view, taken along section lines 8A-8A in FIG. 7, of the illustrative drag adjusting reel assembly.
Figure 12:
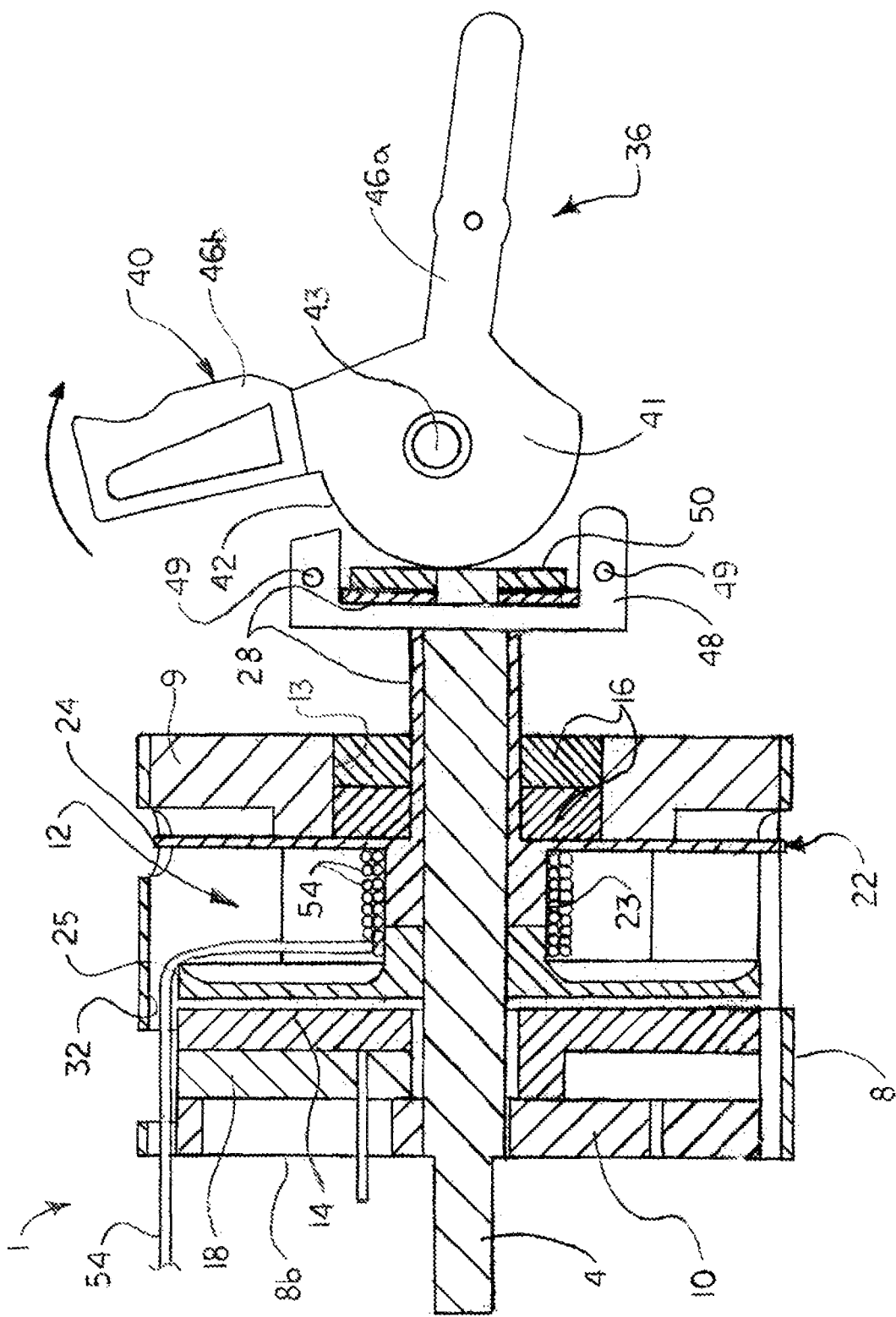
FIG. 12 is an enlarged cross-sectional view of the reel housing and drag adjusting mechanism of the drag adjusting reel assembly.

A reel housing 8 may extend forwardly from the mount frame 7 of the reel mount bracket 5. The reel housing 8 may have a rear housing end 8a and a front housing end 8b. A rear housing plate 9 (FIGS. 8A-8C and 11) may be provided in the reel housing 8 at the rear housing end 8a. A front housing plate 10 may close the front housing end 8b of the reel housing 8. The rear housing plate 9 may have a central bearing opening 13 (FIG. 12). As illustrated in FIGS. 11 and 12, at least one bearing 16 may be disposed in the central bearing opening 13 in the rear housing plate 9. The reel shaft 4 may extend through the bearing 16.

As illustrated in FIGS. 8A-8C and 11, a reel mechanism 12 may be disposed in the reel housing 8. The reel mechanism 12 may include a line spool 22 which is drivingly engaged for rotation by the reel shaft 4 forwardly of the rear housing plate 9. In typical application of the drag adjusting assembly 1, which will be hereinafter described, the fishing line 54 (FIG. 1) may be wound on the line spool 22. The line spool 22 may include a spool hub 23 which may be drivingly engaged for rotation by the reel shaft 4 such as through a splined connection (not illustrated), for example and without limitation. A rear spool flange 24 and a front spool flange 25 may extend from the spool hub 23 in spaced-apart relationship to each other. The rear spool flange 24 of the line spool 22 may be disposed adjacent to the rear housing plate 9. As illustrated in FIG. 12, a spool extension 28 may extend rearwardly from the spool hub 23 through the bearings 16 in the rear housing plate 9, with the reel shaft 4 typically extending through the spool extension 28.

As illustrated in FIGS. 8A-8C, 11 and 12, a rotor 14 may be provided in the reel housing 8 forwardly of the front spool flange 25 of the line spool 22 and drivingly engaged for rotation by the reel shaft 4. A rotor face cover 18 may be provided in the reel housing 8 forwardly of the rotor 14. An annular line payout space 32 may be formed by and between the rotor 14 and the reel housing 8. The fishing line 54 (FIGS. 1 and 12) may extend from the line spool 22 and the reel housing 8 through the line payout space 32.

The drag adjusting assembly 1 may include a drag adjusting mechanism 36 which facilitates selective, user-actuated, manual adjustment of the drag force which is applied to the fishing line 54 via the line spool 22. The drag adjusting mechanism 36 may include a drag adjusting lever 40. The drag adjusting lever 40 may include a cam 41 having a cam surface 42. A lever pivot shaft 43 may pivotally mount the cam 41 on the mount frame 7 of the reel mount bracket 5 rearwardly of the spool extension 28 of the line spool 22.

At least one lever arm 46 may extend from the cam 41 to facilitate manual actuation of the drag adjusting lever 40 between free-spooling, home and spool-locking positions, as will be hereinafter described. In some embodiments, a lower lever arm 46a and an upper lever arm 46b may extend from the cam 41. The lower lever arm 46a and the upper lever arm 46b may be actuated typically using the index, middle, ring and/or little finger or fingers of the user.

Figure 9:
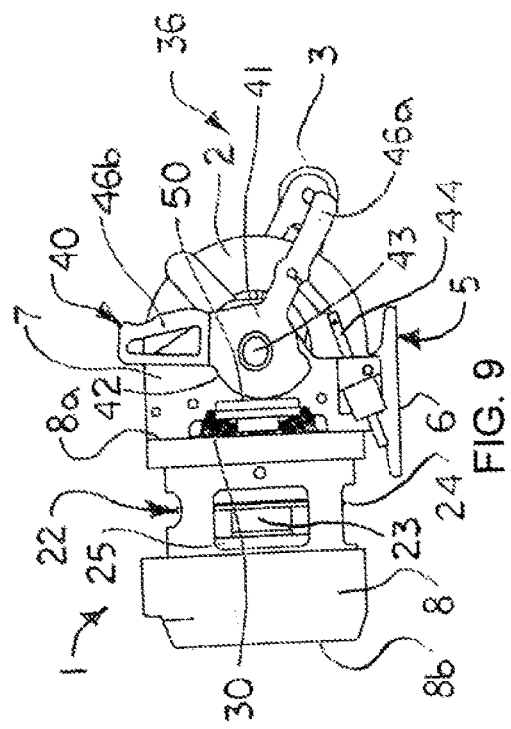
FIG. 9 is a typical left side view of the illustrative drag adjusting reel assembly.

A drag adjusting bracket 48 may be provided on the mount frame 7 of the reel mount bracket 5. The drag adjusting bracket 48 may be fixedly mounted with respect to the mount frame 7 using bracket fasteners 49 and/or otherwise according to the knowledge of those skilled in the art. The spool extension 28 may be disposed rearwardly of the drag adjusting bracket 48. At least one shim plate 50 may be provided between the spool extension 28 and the cam surface 42 of the cam 41. Accordingly, the drag adjusting lever 40 may be selectively configurable in and between a forward, minimal drag, free spooling position (FIG. 8B) and a rearward, maximal drag, spool locking position (FIG. 8C). The drag adjusting lever 40 may be configurable in a middle, home position (FIGS. 8A and 11) which is between the free-spooling position and the spool locking position. As illustrated in FIG. 9, in some embodiments, a lever spring 44 may extend between the lower lever arm 46a of the drag adjusting lever 40 and the reel mount bracket 5. The lever spring 44 may normally bias the drag adjusting lever 40 in the home position.

In the free-spooling position of the drag adjusting lever 40, illustrated in FIG. 8B, the cam surface 42 of the cam 41 may disengage or minimally engage the shim plate 50 such that the spool extension 28 disengages the drag adjusting bracket 48 to facilitate substantially free and unhindered rotation of the line spool 22 in the reel housing 8 and unrestricted payout of the fishing line from the line spool 22 and the reel housing 8. The drag adjusting lever 40 may be gradually pivoted from the free-spooling position, past the home position (FIG. 8A) to the maximal drag, spool locking position (FIG. 8C) in which the cam surface 42 of the cam 41 gradually and incrementally applies increasing force to the line spool 22, typically through the shim plate 50, such that the spool extension 28 progressively engages the drag adjusting bracket 48 as the cam 41 progressively applies drag force to the line spool 22. The cam surface 42 of the cam 41 may be suitably positioned and configured to progressively engage the shim plate 50 as the drag adjusting lever 40 is pivoted from the free-spooling position (FIG. 8B) past the home position (FIG. 8A) to the maximal drag, spool locking position (FIG. 8C). In some embodiments, a selected number of the shim plates 50 may be disposed between the spool extension 28 and the cam surface 42 of the cam 41 to achieve optimal engagement between the cam surface 42 and the line spool 22.

In typical application of the drag adjusting reel assembly 1, the mount pedestal 6 of the reel mount bracket 5 may be mounted on the assembly mount bracket 70 on the fishing bow 60, as illustrated in FIG. 1. Attachment of the mount pedestal 6 to the assembly mount bracket 70 may be facilitated using mechanical fasteners (not illustrated) such as screws, bolts, clamps, clips or the like which are suitable for the purpose. As illustrated in FIG. 12, the fishing line 54 may be wound on the spool hub 23 of the line spool 22 in the reel housing 8. The free end of the fishing line 54 may be extended forwardly from the front housing end 8*b* of the reel housing 8 through the annular line payout space 32. An arrow (not illustrated) may be tied on the free or extending end of the fishing line typically in the conventional manner.

In typical operation of the fishing bow 60, the bowstring 68 may be drawn and then released to shoot the arrow on the fishing line 54 toward a targeted fish (not illustrated) in a body of water. Prior to launching the arrow from the fishing bow 60, the drag adjusting lever 40 may be disposed in the home position (FIG. 8A) or the free-spooling position (FIG. 8B) such that the cam surface 42 of the cam 41 is disposed in light engagement with or disengages the spool extension 28 to maintain the spool extension 28 in a lightly engaged or disengaged position with respect to the drag adjusting bracket 48 and facilitate substantially free rotation with minimal or no drag, respectively, of the line spool 22 in the reel housing 8 as the fishing line 54 unwinds from the rotating line spool 22 and pays out from the reel housing 8 in a substantially unhindered manner until the arrow impales the targeted fish. The reel crank 3 of the drag adjusting reel assembly 1 may subsequently be operated to wind the fishing line 54 onto the line spool 22 as the fishing line 54 retrieves the arrow and the impaled fish.

As he or she subsequently winds the fishing line 54 on the line spool 22 typically by operation of the reel crank 3, the user of the fishing bow 60 may selectively and manually adjust the drag force which the cam 41 of the drag adjusting lever 40 applies to the line spool 22 along a continuum by actuation of the drag adjusting mechanism 36. Accordingly, the user may grasp the lower lever arm 46*a* with the middle or index finger or the upper lever arm 46*b* with one or more of the remaining fingers to pivot the drag adjusting lever 40 in the clockwise direction in FIGS. 8A-8C and 11. This action may gradually increase engagement of the cam surface 42 on the cam 41 against the shim plate 50 and engagement of the shim plate 50 against the spool extension 28 such that the spool extension 28 engages the drag adjusting bracket 48, thereby initiating or increasing the drag force which is applied against the line spool 22 and reducing payout of the fishing line 54 from the reel housing 8. The drag force which the cam 41 applies to the line spool 22 may be selectively reduced by pivoting the drag adjusting lever 40 in the counterclockwise direction in FIGS. 8A-8C and 11, thereby reducing engagement of the cam surface 42 on the cam 41 against the shim plate 50 as the shim plate 50 disengages or reduces engagement with the spool extension 28 and the spool extension 28 with the drag adjusting bracket 48. It will be appreciated by those skilled in the art that the magnitude of the drag force which the cam 41 applies to the line spool 22 can be gradually varied along a continuum as the fishing line 54 is reeled onto the line spool 22 by adjusting the rotational position or orientation of the drag adjusting lever 40, and thus, the extent of engagement of the cam surface 42 against the shim plate 50.

While the preferred embodiments of the invention have been described above, it will be recognized and understood that various modifications may be made in the invention and the appended claims are intended to cover all such modifications which may fall within the spirit and scope of the invention.

What is claimed is:

1. A drag adjusting reel assembly, comprising:
   a reel mount bracket;
   a reel shaft carried by the reel mount bracket;
   a line spool drivingly engaged for rotation by the reel shaft; and
   a drag adjusting mechanism including:
      a drag adjusting bracket carried by the reel mount bracket;
      a spool extension extending from and rotational with the line spool, the spool extension disposed adjacent to the drag adjusting bracket; and
      a drag adjusting lever having:
         a cam including a cam surface configured to selectively actuate the spool extension against the drag adjusting bracket, the cam rotational between a free-spooling position wherein the cam surface disengages or minimally engages the spool extension and the spool extension disengages or minimally engages the drag adjusting bracket, respectively, and a maximal drag, spool locking position wherein the cam surface maximally engages the spool extension and the spool extension maximally engages the drag adjusting bracket; and
         at least one lever arm extending from the cam.

2. The drag adjusting reel assembly of claim 1 wherein the cam is positional in a home position between the free-spooling position and the spool locking position.

3. The drag adjusting reel assembly of claim 2 further comprising a lever spring normally biasing the drag adjusting lever in the home position.

4. The drag adjusting reel assembly of claim 1 wherein the reel mount bracket comprises a mount pedestal and a mount frame carried by the mount pedestal, and wherein the drag adjusting bracket of the drag adjusting mechanism is carried by the mount frame.

5. The drag adjusting reel assembly of claim 1 further comprising at least one shim plate between the cam and the spool extension.

6. The drag adjusting reel assembly of claim 1 wherein the at least one lever arm comprises a first lever arm and a second lever arm.

7. The drag adjusting reel assembly of claim 1 further comprising a reel crank drivingly engaging the reel shaft for rotation.

8. The drag adjusting reel assembly of claim 1 wherein the line spool comprises a spool hub drivingly engaged for rotation by the reel shaft and a first spool flange and a second spool flange extending from the spool hub in spaced-apart relationship to each other, and the spool extension extends from the spool hub.

9. A drag adjusting reel assembly suitable for mounting on a fishing bow frame of a fishing bow, comprising:
   an assembly mount bracket configured for mounting on the fishing bow frame of the fishing bow;
   a reel mount bracket carried by the assembly mount bracket;
   a reel housing carried by the reel mount bracket, the reel housing having a first end housing plate and a second end housing plate;
   a reel shaft carried by the reel mount bracket, the reel shaft extending through the first end housing plate into the reel housing;
   a line spool disposed in the reel housing between the first end housing plate and the second end housing plate, the line spool drivingly engaged for rotation by the reel shaft; and a drag adjusting mechanism including:
- a drag adjusting bracket carried by the reel mount bracket;
- a spool extension extending from and rotational with the line spool, the spool extension disposed adjacent to the drag adjusting bracket; and
- a drag adjusting lever having:
  - a cam including a cam surface configured to selectively actuate the spool extension against the drag adjusting bracket, the cam rotational between a free-spooling position wherein the cam surface disengages or minimally engages the spool extension and the spool extension disengages or minimally engages the drag adjusting bracket, respectively, and a maximal drag, spool locking position wherein the cam surface maximally engages the spool extension and the spool extension maximally engages the drag adjusting bracket; and
  - at least one lever arm extending from the cam.

10. The drag adjusting reel assembly of claim 9 wherein the cam is positional in a home position between the free-spooling position and the spool locking position.

11. The drag adjusting reel assembly of claim 10 further comprising a lever spring normally biasing the drag adjusting lever in the home position.

12. The drag adjusting reel assembly of claim 9 wherein the reel mount bracket comprises a mount pedestal and a mount frame carried by the mount pedestal, and wherein the drag adjusting bracket of the drag adjusting mechanism is carried by the mount frame.

13. The drag adjusting reel assembly of claim 9 further comprising at least one shim plate between the cam and the spool extension.

14. The drag adjusting reel assembly of claim 9 wherein the at least one lever arm comprises a first lever arm and a second lever arm.

15. The drag adjusting reel assembly of claim 9 further comprising a reel crank drivingly engaging the reel shaft for rotation.

16. The drag adjusting reel assembly of claim 9 wherein the line spool comprises a spool hub drivingly engaged for rotation by the reel shaft and a first spool flange and a second spool flange extending from the spool hub in spaced-apart relationship to each other, and the spool extension extends from the spool hub.

17. A drag adjusting reel assembly suitable for mounting on a fishing bow frame of a fishing bow, comprising:
- an assembly mount bracket configured for mounting on the fishing bow frame of the fishing bow;
- a reel mount bracket carried by the assembly mount bracket;
- a reel housing carried by the reel mount bracket, the reel housing having a first end housing plate and a second end housing plate;
- a reel shaft carried by the reel mount bracket, the reel shaft extending through the first end housing plate into the reel housing;
- a reel crank drivingly engaging the reel shaft for rotation;
- a line spool disposed in the reel housing between the first end housing plate and the second end housing plate, the line spool drivingly engaged for rotation by the reel shaft; and
- a drag adjusting mechanism including:
  - a drag adjusting bracket carried by the reel mount bracket;
  - a spool extension extending from and rotational with the line spool, the spool extension disposed adjacent to the drag adjusting bracket; and
  - a drag adjusting lever having:
    - a cam including a cam surface configured to selectively actuate the spool extension against the drag adjusting bracket, the cam rotational between a free-spooling position wherein the cam surface disengages or minimally engages the spool extension and the spool extension disengages or minimally engages the drag adjusting bracket, respectively, a maximal drag, spool locking position wherein the cam surface maximally engages the spool extension and the spool extension maximally engages the drag adjusting bracket and a home position between the free-spooling position and the spool locking position:
    - a first lever arm and a second lever arm extending from the cam;
    - a lever spring normally biasing the drag adjusting lever in the home position.

18. The drag adjusting reel assembly of claim 17 wherein the reel mount bracket comprises a mount pedestal and a mount frame carried by the mount pedestal, and wherein the drag adjusting bracket of the drag adjusting mechanism is carried by the mount frame.

19. The drag adjusting reel assembly of claim 17 further comprising at least one shim plate between the cam and the spool extension.

20. The drag adjusting reel assembly of claim 17 wherein the line spool comprises a spool hub drivingly engaged for rotation by the reel shaft and a first spool flange and a second spool flange extending from the spool hub in spaced-apart relationship to each other, and the spool extension extends from the spool hub.

* * * * *